Sept. 7, 1926.  
J. L. GREENWOOD  
TIRE CARRIER AND CHANGER  
Filed June 1, 1925  
1,599,327  
2 Sheets-Sheet 2
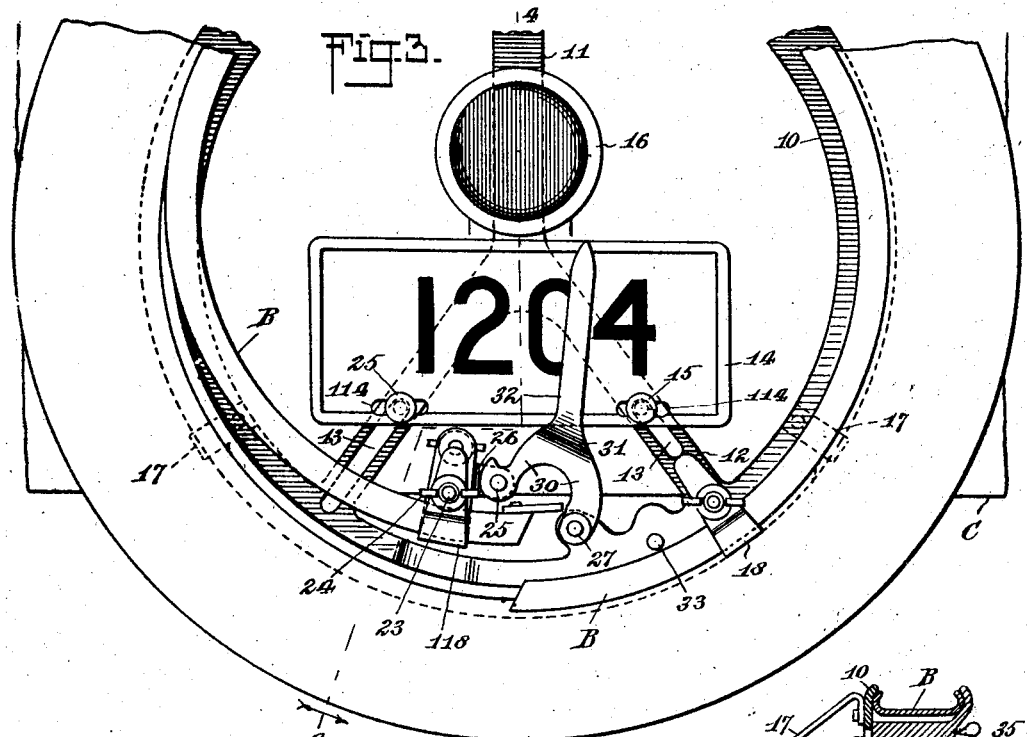
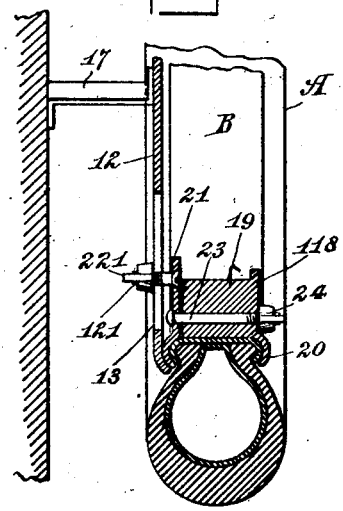
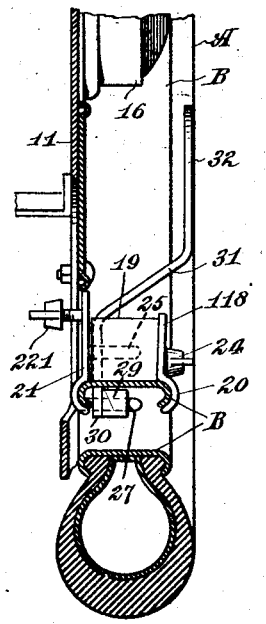
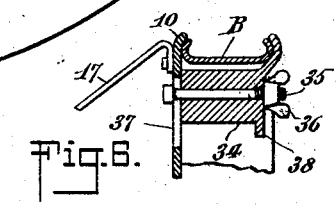
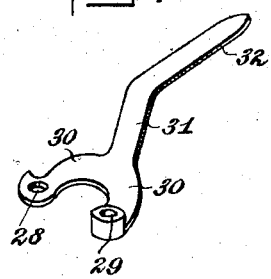
WITNESSES
INVENTOR  
J. L. Greenwood  
BY  
ATTORNEYS Patented Sept. 7, 1926.

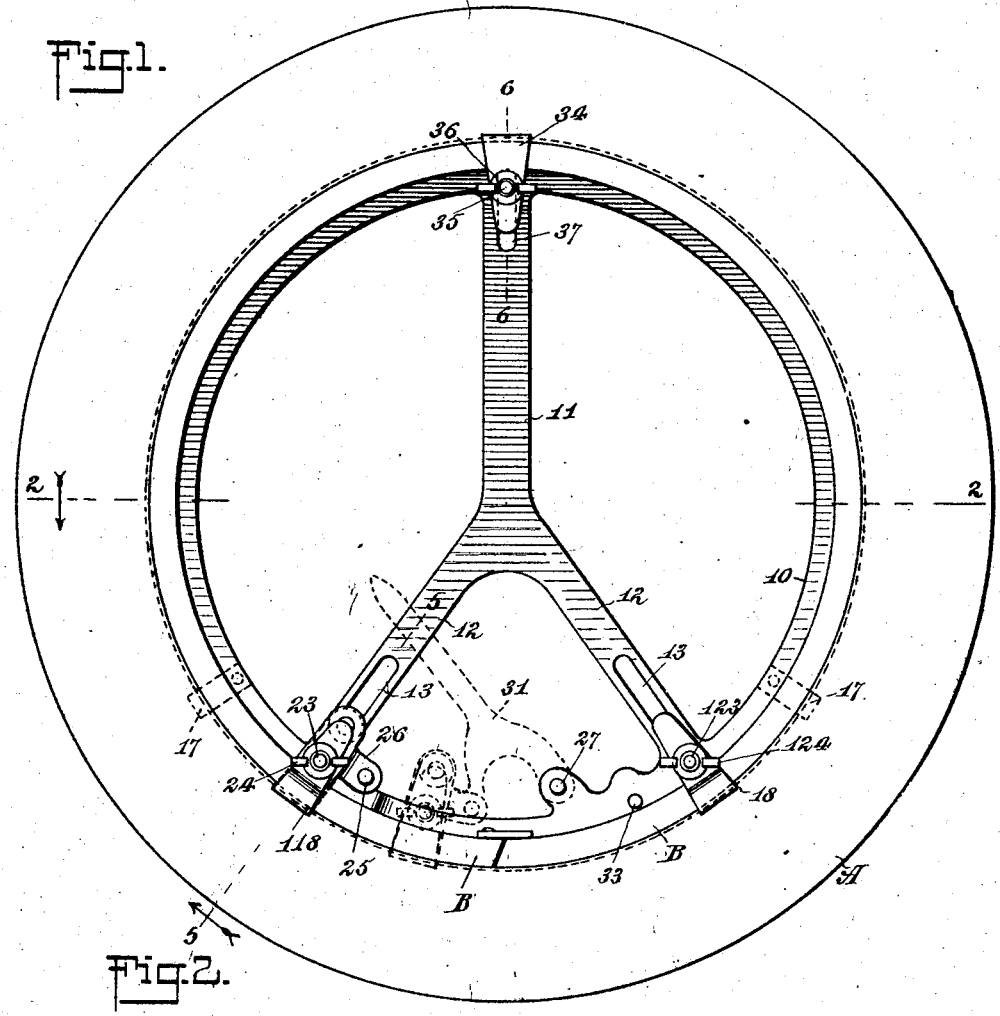

1,599,327

UNITED STATES PATENT OFFICE.

JASPER LEOPOLD GREENWOOD, OF NORTH EAST HARBOR, CANADA.

TIRE CARRIER AND CHANGER.

Application filed June 1, 1925, Serial No. 34,256, and in Canada May 26, 1925.

My invention relates to a means adapted to function either as a carrier for a spare tire on an automobile or as a tire-changing means to be emplaced on a table or like support.

The general object of my invention is to provide a tire carrier embodying means whereby a tire may be changed, whereby the double function of a carrier and a tire changer is attained.

A further object of my invention is to provide a device readily convertible from a tire carrier to a tire changer and more specifically the invention has for its object to provide a strong and simple construction of few parts and easily manipulated.

The nature of my invention and its distinguishing features and advantages will appear as the description proceeds.

Reference is to be had to the accompanying drawings forming a part of this specification, it being understood that the drawings are merely illustrative of one example of the invention.

Figure 1 is a front elevation of a combined carrier and changer showing the same in use as a carrier;

Figure 2 is a horizontal section on the line 2—2, Figure 1;

Figure 3 is a plan view of my improved device employed as a tire changer;

Figure 4 is a transverse section on the line 4—4, Figure 3;

Figure 5 is a transverse section on the line 5—5, Figure 1;

Figure 6 is a transverse section on the line 6—6, Figure 1;

Figure 7 is a perspective view of a tool for operating the device when used as a tire changer.

In the illustrated example of my invention the letter A indicates a tire; B, a tire rim; and C, Figures 2 and 5, indicates a conventional representation of the back of an automobile. c, Figure 3, indicates a table employed in the changing of a tire.

In carrying out my invention in accordance with the illustrated example, a spider 10 is provided comprising a ring with an inverted Y-shaped member 11 at the center, the numeral 12 indicating the arms of the frame member 11, and 13, slots in said arms. The numeral 14 indicates a license plate held to the arms 12 by bolts 15 passing through the slots 13 and through longitudinal slots 114 in said license plate 14.

The numeral 16 indicates a lamp mounted on the main portion of the Y-shaped frame member 11 and therefore positioned above the license plate 14.

The spider frame 10 is secured to separated brackets 17 which also are secured in practice either to the back C of an automobile or to the table c according to whether the device is to be employed as a carrier for a spare tire for the automobile or for changing the tire on the table.

On the arms 12 near the outer ends, clamps, designated generally by the numerals 18, 118 are provided engaging the tire rim B and holding the same to spider frame 10. As best seen in Figures 2, 4 and 5, the clamp 118 comprises a block 19 which may be of any suitable shape, said block having at one end a clamp jaw 20 formed thereon or secured thereto. At the opposite end of block 19 is a clamp jaw 21 between which jaws 20 and 21 the rim B is received. A bolt 23 passes through the block 19 and through the separate clamp jaw 21 and receives a nut 24 which in practice is a wing nut. Thus, by tightening the nut 24 the jaws 20 and 21 may be bound firmly onto the rim B. The clamp jaw 21 receives a bolt 121 having a nut 221, said bolt passing through the slot 13 in the adjacent arm 12. The clamp 18 has a block 119 held directly to frame 10 by a bolt 123 having wing nuts 124 at its opposite ends, said bolt 123 passing also through frame 10 and through a separate jaw 120 acting to grip the rim B so that the rim is clamped firmly to the frame 10.

The one clamp (18) is permanently secured to the frame 10 adjacent to one arm 12, that is to say, the right arm 12 shown in Figure 1. The other clamp (118) is secured in either of two positions according to the purpose the device is to serve. In Figure 1 I have shown the left-hand clamp (118) secured to the frame 10 in line with the adjacent arm 12 of said frame. In the positions of the clamps 18, 118, as thus referred to, the device is efficient as a tire carrier and the tightening of the nuts 24 holds the rim B and tire A firmly in place on the frame 10.

When the device is to be used as a tire changer, the arrangement is as in Figure 3 in which it will be seen that the left-hand clamp (118) has been shifted from the position of Figure 1 to the right and nearer the adjacent end of the rim B. On the clamp 118 a stud 25 is provided, said stud being shown as formed on a lateral arm 26 integral with said clamp, see Figures 1 and 3. It will thus be seen that the stud 25 is positioned near one end of the rim B and the clamp 118 is detached from the adjacent arm 12 to which it is secured in the arrangement of Figure 1 for adapting the device as a tire changer. A stud 27 is provided on the rim 10 near the opposite end of the tire B. The two studs 25, 27 in the changing of the tire are received in bores 28, 29 in the arms 30 of a lever 31, the terminal portion or handle portion 32 of which lever is offset laterally outward, so that the hand operating the lever will have clearance and not contact with the lamp 16 (see Figure 4). By rocking the lever 31 to the right in the assemblage of Figure 3, it will be seen that one end of the rim B will be drawn inward or toward the center of the frame 10 and out of line with the opposite end of said rim B, thereby permitting the tire to be removed for changing tires. A stud 33 may be employed, as shown clearly in Figures 1, 2 and 3, extending adjacent to and at the inside of rim B at one end to assist in preventing undue displacement of the rim in changing tires.

In line with the arm 11 of the spider frame 10, that is to say, on the medial line between the arms 12 and at the opposite side of said frame 10 is an additional clamp 34 comprising a block through which passes a bolt 35 having a wing nut 36, said bolt also passing through a slot 37 in frame 10 and through a clamp member 38 at the opposite side of rim B so that the tightening of the nut 36 will bind the rim B between the frame 10 and the clamp member 38. Thus, it will be seen that the clamp 34 is substantially the same as the clamp 18. Said clamp 34, however, is adjustable radially by reason of the slot 37.

From the foregoing, it will be apparent that the frame 10 is adapted to receive a tire rim with a tire thereon in a manner that the device functions efficiently as a tire carrier and it will be seen that the clamps 18, 118 with the studs 25, 27 are employed as a means to permit of the changing of a tire while the rim is supported on the carrier, thus embodying the two functions of a tire changer and a tire carrier in one and the same device.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A combined tire carrier and rim breaker, including an annular frame, three rim engaging clamps secured at spaced points to the frame and engageable with the rim, one of said clamps being disengageable from the frame and attachable to the rim at a point near the end of the latter, said last mentioned clamp including means for coaction with a rim breaking tool, and said frame including a fulcrum for a rim breaking tool.

2. A device as described in claim 1, wherein the annular frame is supported on a spider and one of the clamps is shiftable radially on a leg of the spider.

3. A device as described in claim 1, and wherein one of the clamps is permanently secured to the frame.

4. A combined tire carrier and rim breaker including a frame, said frame including a spider and an annular member supported by the spider, an extension on the annular frame member upon which a rim breaking tool is adapted to fulcrum, a pair of clamps fixed to the spider and engageable with a rim, a third clamp adapted to be selectively attached to the spider and engaged with the rim, or to be mounted on the rim adjacent said fulcrum, said third clamp carrying means for coaction with a rim breaking tool fulcrumed on the frame.

JASPER LEOPOLD GREENWOOD.